April 4, 1961   H. H. NICK   2,978,286
PREAGING METHOD

Filed May 29, 1959   2 Sheets-Sheet 1

INVENTOR
HOWARD H. NICK

BY D. Kendall Cooper

ATTORNEY

United States Patent Office 2,978,286
Patented Apr. 4, 1961

2,978,286
PREAGING METHOD
Howard H. Nick, Wappingers Falls, N.Y., assignor to International Business Machines Corporation, New York, N.Y., a corporation of New York
Filed May 29, 1959, Ser. No. 816,742
2 Claims. (Cl. 316—1)

This invention relates to methods for preaging lamps, and more particularly to a method for preaging neon or glow lamps.

If newly manufactured glow lamps are immediately incorporated into various circuits, the are likely to exhibit varying degrees of instability, which visually, are evidenced by the erratic movement or jumping of the glow back and forth between the electrodes of the glow lamp, movement of the glow along the electrode from one extremity to another in a similarly erratic manner, fluctuation of light output as a result of the erratic movement of the glow, and other equally unpredictable and unstable characteristics, which may not be visible, but which may be observed with appropriate oscilloscope test procedures. The various characteristics indicated usually have an adverse effect on the overall operation of the circuit in which the glow lamp is incorporated.

In order to minimize these various undesirable characteristics, it has been found desirable to subject the glow lamp to an initial, controlled "break-in" period, or to "preage" the glow lamp. The purpose of the preaging is to eliminate the usual causes of the erratic operation, which, among other things, include the presence of certain unwanted gases within the glow lamp envelope and inherent surface conditions of the electrodes which are established during manufacturing of the glow lamps.

Various methods have been proposed in the prior art for preaging glow lamps. Some of the preaging methods currently in use are as follows:

(1) A direct current potential is applied to the glow lamp for a selected period of time at a given current, usually two or three times higher than the rated current of the glow lamp. The current is then reduced to about one half of the initially applied value for a second period of time.

(2) Another known method involves the application of a pulsating direct current potential for a first period of time at a particular current level. Subsequently, the current is reduced, and the preaging continues for a second period of time.

(3) In a third method, a very high voltage pulse is applied to the glow lamp for a very short interval of time in one direction only.

These methods have proved to be satisfactory when the lamps have been used in circuits which do not require high operational stability. However, when it is desired to incorporate lamps preaged according to any of these prior art methods in circuit applications which do have more exacting stability requirements, such as high speed counting or computing applications, prior preaging methods prove to be unsatisfactory.

Thus, lamps preaged according to known methods, might still exhibit various undesirable characteristics, including tendencies to oscillate. Certain of the prior art preaging methods might also cause a reduction in the life of a lamp because of the employment of excessive currents. In addition, each of the enumerated methods serve to preage one electrode only of the glow lamp. This results in an incomplete and unsatisfactory preaging of the lamp, since impurities still exist in the other electrode and elsewhere within the glow lamp.

An object of the invention is to provide an improved method for preaging glow lamps.

Another object of the invention is to provide an improved preaging method, wherein the electrodes of a glow lamp are alternately and equally preaged during the process.

Another object of the invention is to provide a method for preaging glow lamps which may be performed efficiently with readily available materials.

Another object of the invention is to provide a method for preaging a glow lamp which insures high operational stability in the preaged lamp.

Another object of the invention is to provide an improved method for preaging a glow lamp which does not adversely affect or reduce the life of the lamp.

Another object of the invention is to provide a technique for preaging or burning-in only selected portions of the electrodes of the glow lamp during the preaging process.

In accomplishing these and other objects, there has been provided in accordance with the present invention, a method for preaging a glow lamp wherein an electrical potential is applied to the glow lamp which alternates to an equal extent about a selected reference level, and wherein, a current flow is established in the glow lamp during the preaging process which has a functional relationship to the current flow which is expected to be encountered during actual circuit use.

The foregoing and other objects, features and advantages of the invention will be apparent from the following more particular description of the preferred embodiment of the invention, as illustrated in the accompanying drawings.

In the drawings:
Fig. 1 depicts a circuit for performing the preaging method according to the present invention.

Figure 4:
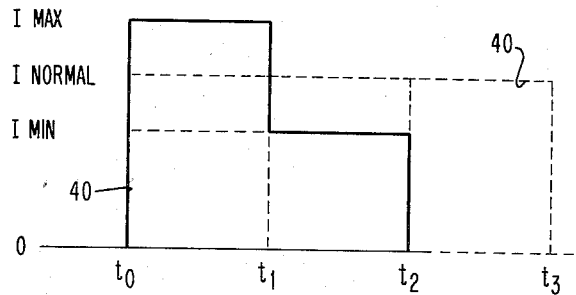

Fig. 4 graphically indicates relative time intervals for which particular selected currents may be established during the preaging method disclosed herein.

Figure 5A:
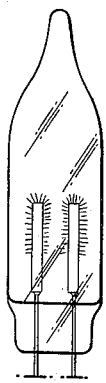
Figure 5B:
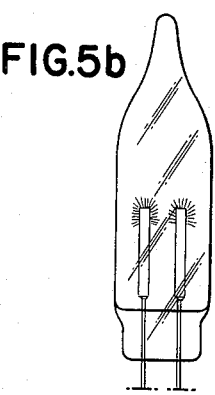
Figure 5C:
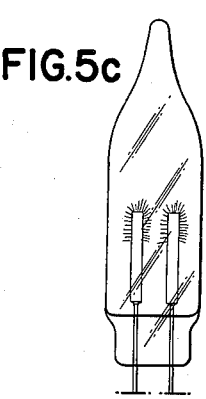

Fig. 5a, 5b, and 5c show typical glow conditions which may be encountered during the preaging process.

Figure 6:
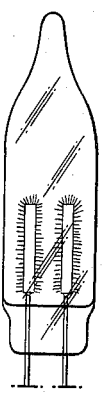

Fig. 6 illustrates the glow condition which may be encountered if excessive currents are used for preaging.

Figure 7:
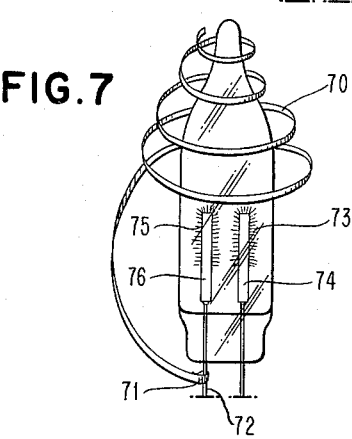

Fig. 7 shows a simple device which may be used to position the glow on the electrodes during the preaging process, thus determining the portion of the electrode which is preaged.

Figure 8:
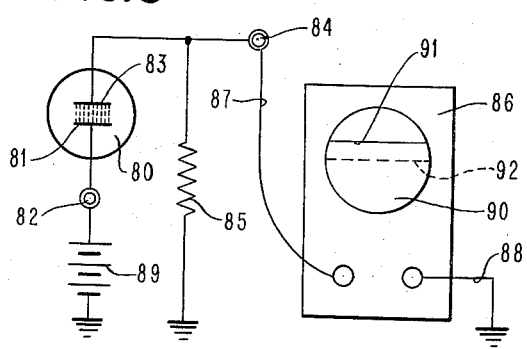

Fig. 8 depicts a simple test circuit for oscilloscope observation of a preaged neon.

Figs. 9a, 9b, 9c, 9d, and 9e depict oscilloscope wave forms which represent various conditions of stability and instability which may be observed in glow lamps.

Figure 1:
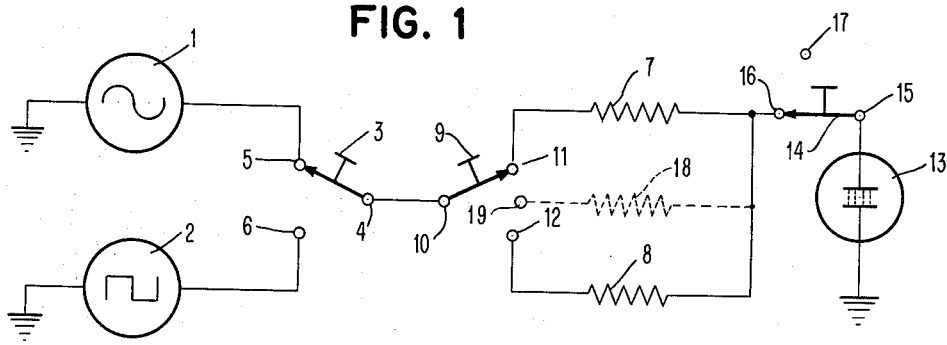

Referring to Fig. 1, a preferred circuit configuration is depicted for preaging a glow lamp according to the present invention. In the circuit of Fig. 1, two sources of alternating potential are provided, a sine wave or sinusoidal voltage generator 1, and a square wave voltage generator 2, either of which may be selected, as desired, by means of a switch 3, which has common terminal 4 and two selecting terminals 5 and 6. The circuit of Fig. 1 is also provided with two resistors 7 and 8 for establishing two particular current levels in the circuit, and a third resistor 18, which is shown in phantom form and which may be added to the circuit, if desired for establishing a third current level in the circuit. Any one of the resistors may be inserted in a series manner into the circuit by means of a switch 9, which has a common terminal 10 and selecting terminals 11, 12 and 19. A glow lamp 13 has been connected in the circuit of Fig. 1 for preaging by the closure of switch 14 which has a common terminal 15, an On terminal 16 and an Off terminal 17.

As shown in Fig. 1, a sine wave potential from the generator 1 is being applied through the switch 3, through the switch 9, through the resistor 7 and through the switch 14 to the glow lamp 13. The circuit connections shown in Fig. 1 would usually exist during the first stage of the preaging process.

In actual practice, the ohmic values of the resistors 7, 8 and 18 would usually have particular, proportional relationships. Thus, resistor 8 might have an ohmic value 2.0 times the value of resistor 7, and resistor 18, if provided, might have an ohmic value 1.5 times the value of resistor 7.

Various other ratios of the resistors might be selected, depending upon the particular currents which it is desired to establish during the preaging process. With the ratios indicated, a maximum current flow will be established during the first stage of the process which is depicted in Fig. 1.

In practicing the invention with a typical glow lamp, the current flow through the glow lamp is preferably established at a relatively higher level during a first interval of time, as shown in Fig. 1, and subsequently, by transferring the switch 9 so that it contacts terminal 12, a relatively smaller current flow is established in the circuit because of the higher resistance of resistor 8, for a second desired interval of time. An intermediate current flow may be established through resistor 18, if provided, for a third interval of time, by transferring the switch 9 so that it contacts the terminal 19.

As mentioned previously, a square wave voltage generator 2 has been provided as a potential source in the circuit of Fig. 1, in addition to the sine wave voltage generator 1. In practicing the present invention it has been found that the best preaging results are obtained with an alternating voltage generator which has characteristics similar to either a sine wave voltage generator, such as the generator 1, or to a square wave voltage generator, such as the generator 2. So, while the since wave generator 1 is providing the necessary preaging potential in the circuit of Fig. 1, equally results would be obtained by applying the alternating potential from the square wave voltage generator 2, which may be accomplished by transferring the switch 3 so that it will contact the terminal 6.

In general, therefore, best results will be obtained if the voltage source provides an alternating voltage output that rises and falls to an equal extent above and below a particular reference level. Thus, the sine wave output of the generator 1, or the square wave output of the generator 2, would alternate around this reference level, in the preferred circuit shown in Fig. 1.

Various other types of generators or voltage sources may be successfully employed in practicing the present invention, so long as they provide an effective, alternating potential comparable to the generators 1 and 2, and so long as the frequency of alternation is within the range of frequency response of the glow lamp being preaged.

It has been observed that the best preaging results will be obtained if the frequency of the applied potential is maintained within certain limits. With currently available glow lamps, best preaging results have been obtained when the frequency of the applied potential was in the range of 60 cycles/second to 400 cycles/second. Results obtained when the applied potential had a frequency of 1000 cycles/second for example, were satisfactory, but not as good as the results obtained when the frequencies were down within the range just mentioned.

The primary purpose of any preaging process is to minimize the existence of impurties inside the glow lamp, including the electrodes and the glass wall itself. It is these impurities that exist with a glow lamp that has not been preaged or that has been improperly preaged, which cause erratic operation in actual use.

Thus, during the preaging process, adsorbed gases and other impurities within the glow lamp are released and may combine with the electrode material to form new chemical compounds which have an effect on the ignition voltage of the glow lamp.

It is believed that in presently available glow lamps a certain amount of qtime is required for the emanation and recombination of the gases and the metals of which the glow lamp electrodes are composed. In these presently available glow lamps, insufficient time is available for the necessary chemical reactions to take place, if the applied frequency is above the range mentioned, and inadequate preaging takes place, if the frequency is much below the range mentioned, since the lower frequencies may be similar in their net effect, to the D.C. potentials used in the prior art.

However, it is apparent that as the art progresses, glow lamps will be developed which will have substantially faster reaction times during the preaging process, and thus it is feasible that some higher frequency may then be employed, with entirely satisfactory results being obtained.

As a practical example, if the glow lamp 13 shown in Fig. 1 were of the well known type NE-96, which has a nominal ignition potential of 135 volts and a nominal maintaining potential of 75 volts, and if the nominal value of the current in the circuit in which the glow lamp 13 is to be incorporated is expected to be 2.0 milliamps, the following potentials and component values might be employed in the circuit of Fig. 1 for achieving proper preaging of the glow lamp 13, according to the present invention.

Sine wave generator voltage output: 169 volts, peak, 120 volts R.M.S.
Sine wave generator frequency: 115 cycles per second.
Resistor 7—50K ohms.
Resistor 8—100K ohms.
Resistor 18 (if provided)–75K ohms.

The magnitude of the applied potential, and the reference level about which it alternates, are preferably selected so that an ignition and extinction will first occur with current flowing in one direction and so that an ignition and extinction will subsequently occur with current flowing in the opposite direction, during a single cycle of alternation.

As indicated, the NE-96 ignites at 135 volts and is extinguished at 75 volts. The application of a potential which reaches a 169 volt peaks in both positive and negative directions and which, in this case, alternates about a ground reference level, will achieve the double ignition-extinction action and equal but opposite current flow during each alternating cycle.

With the component values and voltage values listed above, and with the circuit connections made as shown in Fig. 1, a first current flow of approximately 2.4 milliamps would be established. In practice, this current flow would be maintained for an initial period of around 24 hours. However, it is apparent that this period of time is subject to variation, depending upon the applied potentials, the values selected for the circuit components shown in Fig. 1, and the type of glow lamp which is being preaged.

After the aforementioned initial period of 24 hours, the switch 9 would be transferred so that it would then contact the terminal 12. This effectively places the resistor 8 into series relationship in the circuit of Fig. 1 so that a second particular and lower current flow would be established through the glow lamp 13 during a subsequent period of time. If the resistor 8 has a value of 100K ohms, as previously mentioned, a current flow would be established during the subsequent interval of time, at a level of approximately 1.7 milliamps.

In the typical application being described, the second interval of time might correspond to the first interval of time and thus have a duration of 24 hours. As mentioned before, this interval depends upon the circuit components, the selected potentials, and the type of glow lamp being preaged. Thus, in some cases, each of the successive time intervals, might be shortened to 5 or 10 hours or lengthened to 72 or more hours, depending on the degree of stability required in the lamp.

As previously mentioned, a potential may be applied during the preaging process from the square wave generator 2, shown in Fig. 1, rather than the sinusoidal wave generator 1. This may be simply done in the preaging apparatus depicted in Fig. 1 by transferring the switch 3 so that it contacts terminal 6. The voltage available from the square wave generator 2 would be applied during a first interval of time through resistor 7, and during a second interval of time through the resistor 8, in a manner similar to that previously described.

If it is desired, in either of the typical applications just described, to establish a current flow through the glow lamp 13 which will closely correspond to the current flow which is expected to be encountered in actual circuit use, the third resistor 18 might be included in the apparatus depicted in Fig. 1, in a parallel relationship with resistors 7 and 8.

The resistor 18 might have a value of 75K ohms. It would be switched into the preaging circuit for a third interval of time through switch 9 and terminal 19 to establish a current flow through the glow lamp 13, which closely corresponds to the normal current flow to be expected in subsequent circuit use.

Figure 2:
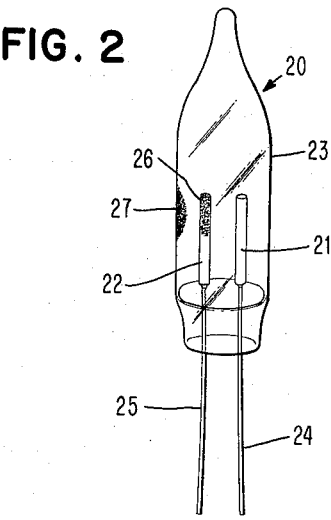
Fig. 2 represents a glow lamp which has been preaged according to one of the above enumerated prior art techniques.

Referring now to Fig. 2, a glow lamp 20 is illustrated which represents a glow lamp typical of those preaged according to various methods known in the prior art. The glow lamp 20 has two electrodes 21 and 22 which are housed within the evacuated glass envelope 23 of the glow lamp 20, and which are respectively connected to terminal leads 24 and 25. An inspection of the glow lamp in Fig. 2 will reveal that the electrode 22 has a darker area 26, which extends from the top of the electrode 22 for a distance of approximately one-half the length of the electrode. The electrode 21, on the other hand, has no such dark area on its surface. The condition represented by the dark area 26 on the electrode 22 and no corresponding dark area on the electrode 21 is usually present when any of the aforementioned prior known preaging methods are used.

The difference in appearance between the electrodes 21 and 22, as displayed in Fig. 2, is a direct result of the application of a voltage during preaging for selected intervals of time in one direction only. As previously mentioned, the typical prior art preaging methods contemplate the application of, for example, a D.C. potential which has a non varying level, a pulsating D.C. potential, or a single pulse of high potential and short duration.

A dark area 27 is also shown on the inside of the glass envelope 23 of the glow lamp 20 in Fig. 2, and this dark area might result from the application of a high level potential which results in a high or excessive current flow through the glow lamp 20. The dark area 27 results from metal particles flying off the electrode 22 as a result of the excessive current flow.

Figure 3:
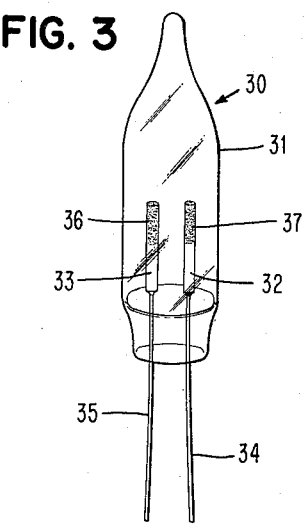
Fig. 3 shows a glow lamp which has been preaged according to the method disclosed herein.

Referring now to Fig. 3, a glow lamp 30 is depicted which represents a typical glow lamp preaged according to the method of the present invention. Incorporated within the glass envelope 31 of the glow lamp 30 are two electrodes 32 and 33 which are respectively connected to terminal leads 34 and 35. An inspection of the glow lamp depicted in Fig. 3 which has been preaged according to the method disclosed herein, will reveal that dark areas 36 and 37 exist on both electrodes 31 and 32. It will be noted that the dark areas 36 and 37 are comparable in shading and that they extend a comparable distance from the tops of the electrodes.

As displayed in Fig. 3, a glow lamp which has been preaged according to the method presented herein, will possess electrodes that are equally preaged.

An alternating voltage for preaging glow lamps is to be preferred for achieving equally preaged electrodes, since it causes both electrodes to glow during the preaging process and the glow areas on the respective electrodes alternately expand and diminish. As a result of this equal and opposite alternate expansion and diminishing, comparable areas in the two electrodes have impurities released and thus, the preaging process according to the present invention produces electrodes which have comparable characteristics, in that the formation of new chemical compounds in both electrodes has taken place alternately and concurrently during periods of time which depend upon the frequency applied. This results in a balanced and stable relationship between the two electrodes.

It has been observed that the condition of each electrode directly affects the other electrode during actual circuit operation, and it is important in order to insure stable operation, that both electrodes be preaged to an approximately equal extent and in a particular and controlled manner. Preaging glow lamps according to the method described herein provides a "burning in" period for both electrodes, as contrasted with prior art methods which provide a "burning in" period for only one electrode.

As previously mentioned, the burning-in period allows adsorbed gases and impurities in the glass walls and the electrodes of the glow lamp to escape. Many changes occur during this period. It is quite possible, for instance, for the gas pressure inside the neon to increase as a result of undesirable gases, such as oxygen, hydrogen, or nitrogen emerging from the electrodes and the glass walls of the glow lamp. If gas pressure inside the glow lamp increases, a number of undesirable conditions may result. For example, the ignition potential of the glow lamp will become erratic or unpredictable. Also the released gases may chemically combine with the electrode material to form new compounds which also have an effect on the neon ignition voltage. The cathode electrode may be disintegrated by positive ion bombardment. Atoms of the electrode metal are then thrown off and imbed themselves in the glass walls of the glow lamp. During their travel through the gases in the lamp, some of the gas molecules are carried along with the metallic atoms and may also be imbedded in the walls of the lamp along with the metallic atoms. This results in decreased gas pressure and a blackening of the glow lamp bulb, previously pointed out in Figure 2.

During the burning in period, the characteristics of the glow lamp are constantly changing are are usually uncertain. However, the preaging process of the present invention permits close control over the glow lamp during the transitory burning in period, and further permits fairly accurate predictions to be made concerning the characteristics of the lamp which will be exhibited during later circuit use.

Figure 4 is a graphical and symbolic representation of the time intervals and current levels which are established during the preaging process. At time $t_0$ in Fig. 4, a current represented as I Max is established in the glow lamp preaging circuit of Fig. 1 and this current is maintained for a given period of time from $t_0$ to $t_1$, which in the practical example previously discussed, was about 24 hours. At time $t_1$, the switch 9 is then moved to terminal 12 in Fig. 1 and a current represented as I Min of Fig. 4 is applied from time $t_1$ to time $t_2$ which also, in the practical example, was about 24 hours. As previously discussed, if a third resistor were added to the circuit of Fig. 1, the current through the glow lamp could be established as I Normal during the time interval $t_2$ to $t_3$, as indicated by the dashed line 40 in Fig. 4 for a third period of time, approximating 24 hours.

A better understanding of the terms I Min, I Normal and I Max used in Fig. 4 will be obtained if the following definitions are considered. I Normal is the current which is expected to exist in the glow lamp during its normal circuit operation. I Max is a current established during the preaging process which is of a sufficient value to extend above any deviation which may occur in the I Normal current during actual circuit used. Thus, I Max represents a current which has a greater magnitude than the maximum transient level that may be expected to occur in the glow lamp circuit, under normal operation. Conversely, I Min represents a current which has a magnitude comparable to the minimum transient current that may exist in the glow lamp circuit during normal operations. In the practical example previously discussed, I Normal was approximately 2.0 milliamps, I Max was 2.4 milliamps, and I Min was approximately 1.7 milliamps.

As a summation of the above discussion it is apparent that the various currents represented in Fig. 4, namely, I Max, I Normal and I Min would be established at desired levels according to the type of glow lamp being preaged and the particular use to which the lamp will be applied in a circuit.

It is also apparent that the time intervals indicated in Fig. 4 will vary according to the degree of preaging desired for a particular circuit application in which the glow lamp is to be used.

It should be mentioned here that the length of preaging time and the magnitude of the currents passed through the glow lamp during the preaging period have an effect on the life characteristics of the glow lamp and these values should be determined prior to the initiation of the preaging process, in order to maintain close control of the process.

Referring now to Figs. 5a, 5b, and 5c, glow lamps are depicted which show typical variations in glow conditions which may exist during preaging. The three conditions shown represent the glow which would exist at various current levels. The glow surrounding the electrodes varies in magnitude, and is proportional to the magnitude of the current established in the glow lamp. In Fig. 5a, the glow surrounds about one half the electrode length. This could represent a current flow of I Max, which, as previously mentioned, is established during the first preaging time interval $t_0$–$t_1$, Fig. 4. Fig. 5b might indicate a current of I Min passing through the glow lamp during the second time interval, $t_1$–$t_2$ and Fig. 5c might indicate the third current level I Normal in Fig. 4, which is established during the third time interval $t_2$–$t_3$.

It is important to avoid excessive currents in the glow lamp during the preaging process, as well as during its actual normal use in a circuit. Fig. 6 represents a glow lamp which has the glow completely surrounding the electrodes due to the establishment of an excessive current. The current density present on the surfaces of the electrodes, i.e., milliamperes/centimeter squared, will remain fairly constant as the magnitude of the current is increased, as long as an unexposed portion of the electrode still remains. However, once the electrode becomes completely encompassed by the glow, the current density then increases very rapidly and if corrective action is not taken, the glow lamp will probably "breakdown" and burn out. Thus, Fig. 6 represents an undesirable condition which should be avoided in practicing the preaging method disclosed herein. If breakdown of the glow lamp does not actually take place, the life of the glow lamp will, at least, be drastically reduced and the normal circuit use of the glow lamp will be highly unpredictable due to the fact that the excessive current level has produced unstable characteristics.

Referring to Figs. 5a, 5b, and 5c, it will be noted that the glow, in each case, extends from the top of the electrode to some point along the length of the electrode. However, in actual practice, the glow may exist at any point along the electrode between its extremities, and may not, necessarily, be confined to the areas shown in Figs. 5a, 5b, and 5c.

Referring to Fig. 7, a device is shown which, when employed, positions the glow so that it occurs in a predetermined area of the electrode.

It is believed that the device shown in Fig. 7 accomplishes positioning of the glow by establishing a more concentrated electrical field intensity in particular areas on the electrodes and that the glow is then attracted or confined to these areas.

The areas in which the glow exists during preaging determines where the glow will exist during actual normal circuit operation.

In Fig. 7, it may be assumed that a glow 73 had originally surrounded electrode 74 and that a glow 75 had originally surrounded electrode 76 in areas closer to the lower ends of the respective electrodes. If it is desired to have the glow on each electrode located in the upper portion of the electrode during actual circuit use, for example, the device shown in Fig. 7 may be adjusted to position the glow, accordingly, so that the glow will occur near the top of the electrode during the preaging process. In Fig. 7, positioning of the glow is accomplished by a shield 70 which is preferably of some metallic substance. The shield is formed, in the illustrated case, into a helical coil, and is placed so that the coils surround the glow lamp. To achieve proper functioning of the coil 70, one end 71 is attached to one of the glow lamp terminals 72. By providing the helical shield 70, the respective glows 73 and 75 have been raised, as shown in Fig. 7 so that they occupy the upper extremities of the electrodes 74 and 76.

Various types of shields may be used to accomplish the proper or desired positioning of the glow during preaging. Another type of shield, for example, which has worked satisfactorily for positioning the glow during the preaging process, is a straight wire. The wire is placed adjacent to the glass envelope of the glow lamp and in parallel relationship with its vertical axis. One end of the straight wire would be attached to the terminal lead 72 of the glow lamp shown in Fig. 7, in a manner similar to the attachment of the end 71 of the helical coil 70.

Fig. 8 illustrates a simple test circuit for testing the characteristics of glow lamps. A glow lamp 80 has an electrode 81 connected to a source of D.C. potential, battery 89, at terminal 82, and a second electrode 83 connected to a test outlet terminal 84. Circuit continuity is provided by a resistor 85 connected to ground. In Fig. 8 an oscilloscope 86 is diagrammatically represented as having a test lead 87 connected to terminal 84 and a wire 88 connected to ground. For test purposes, the potential applied to the glow lamp 80 via terminal 82 from the battery 89 is established at a level higher than the ignition potential of the glow lamp 80 under test. For example, if the glow lamp 80 is of the well known type NE—96, which has a nominal ignition potential of 135 volts D.C., the potential applied to terminal 82 might be 150 volts D.C. For test purposes, the value of the resistor 85 is selected so that the current flow established through the glow lamp 80 is at a level which corresponds to the current level to be expected in actual circuit use, i.e., I Normal.

As shown in Fig. 8, a selected potential from the battery 89 is being applied to the glow lamp 80 and as may be seen by the dotted representations between the electrodes 81 and 83 the glow lamp 80 has ignited and is conducting.

The primary purpose of the testing arrangement in Fig. 8 is to determine whether the glow lamp 80 has characteristics which are stable enough to meet the requirements of various circuits in which it is to be used. If the glow lamp 80 in Fig. 8 has stable characteristics, that is, if it is not exhibiting any oscillatory action, this condition is represented on the face 90 of the oscilloscope 86 as a straight and steady trace 91 which represents a potential existing at terminal 84 with respect to a ground reference level. This ground reference level is represented on the oscilloscope face by the dashed line 92.

Figure 9A:
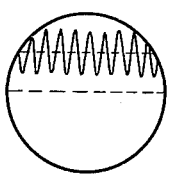
Figure 9B:
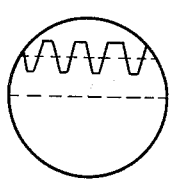
Figure 9C:
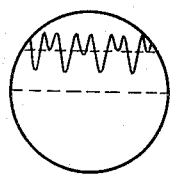

Referring now to Fig. 9a, 9b, and 9c, a series of oscilloscope patterns are displayed which show various kinds of oscillations that might exist in a glow lamp if it has not been properly preaged. These various oscillatory patterns range from the fairly cyclical and repetitive type of waveform shown in Fig. 9a to a waveform such as that disclosed in Fig. 9c which is rather irregular but which still has certain periodic characteristics. The various oscillations displayed in Figures 9a, 9b, and 9c would represent "unstable" or "erratic" oscillations which would be likely to exist during actual circuit use.

Figure 9D:
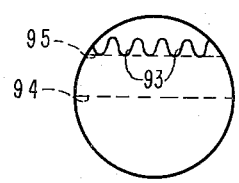

Fig. 9d shows a type of oscillation which might be termed a "stable" oscillation. The term "stable" oscillation has been arbitrarily established as an oscillation that displays oscillatory peaks which do not extend or if they do extend, extend only slightly, into the potential area within which, it is expected, the glow lamp will operate. In Fig. 9d, this would be the area which lies between the level represented by line 94 and that represented by 95.

Thus, there are two forms of observed oscillations which may be exhibited by a glow lamp during conduction. One is a steady or stable type oscillation, which has a frequency of approximately 20 kilocycles. The amplitude of this type of oscillation may vary between 5 and 10 volts. These oscillations seldom occur within the operating range of the glow lamp and, if they do, they are usually confined to 2 or 3 volt excursions. This type of oscillation seldom affects circuit operation.

Unstable oscillations, on the other hand, possess the following characteristics:

(1) Unstable oscillations usually exhibit larger amplitude variations than stable oscillations. 20 volts peak to peak and sometimes 40 to 50 volt excursions are not uncommon.

(2) Unstable oscillations always rise above and below the normal circuit voltage level.

(3) Unstable oscillations usually have rapid variations in frequency. At times, frequencies above 200 kc. are obtained.

The oscilloscope patterns in Figs. 9a, 9b and 9c might have been taken at the same scope settings no longer than one minute intervals apart. These oscillations are unstable and produce circuit failure.

It has been determined that if the oscillations of the glow lamp under test are stable oscillations as shown in Fig. 9d, then such oscillations will not materially affect the performance or the response of the gow lamp in various circuit applications. Thus, the stable oscillations in Fig. 9d do not, as a practical matter, have an adverse effect on glow lamp circuit operation.

Figure 9E:
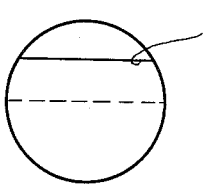

Fig. 9e corresponds to the condition shown on the oscilloscope 86 in Fig. 8 in that the glow lamp under test is providing a steady trace 91, and is exhibiting no oscillations.

Glow lamps which have been preaged according to the method described herein will, in practically all cases, exhibit the steady and stable characteristic displayed in Fig. 9e. Occasionally, glow lamps preaged according to this method might exhibit the stable oscillations displayed in Fig. 9d, which, as mentioned before, do not affect circuit operations to any practical extent. Glow lamps preaged according to the present method will not exhibit any of the undesirable oscillatory characteristics represented by the oscilloscope patterns in Figs. 9a, 9b, and 9c.

Glow lamps preaged according to prior known methods in the art usually exhibit the undesirable oscillations shown in Figs. 9a, 9b, and 9c.

From the foregoing discussion, it is apparent that the method of the present invention, which insures that both electrodes of a glow lamp are preaged to a substantially equal extent, has provided a number of outstanding advantages which were not provided by previously known methods of preaging.

For example, glow lamps preaged according to this method will exhibit no oscillatory characteristics or, stable oscillatory characteristics which have little effect on circuit operation.

Glow lamps preaged according to the present method will possess stable characteristics, will have a much longer life than those preaged by prior known methods, and will afford a standard of reliability in various circuit applications which has not been possible up to the present time.

In addition, an important characteristic which has been observed in glow lamps preaged according to the present method, is that these glow lamps exhibit a more stable light output. This particular observed characteristic has important implications when the glow lamps are considered for use in various photoconductivity or light-sensitive applications.

While the invention has been particularly shown and described with reference to preferred embodiments thereof, it will be understood by those skilled in the art that various changes in form and details may be made therein without departing from the spirit and scope of the invention.

What is claimed is:

1. A method for preaging a sealed glow lamp containing an inert gas and having at least two electrodes, said method comprising the steps of establishing and maintaining for a first interval of time an alternating current in said glow lamp which corresponds in value to the current to be expected from a maximum transient signal in subsequent circuit use, and establishing and maintaining for a second interval of time an alternating current in said glow lamp which corresponds in value to the current to be expected from a minimum transient signal in subsequent circuit use, whereby said electrodes are preaged to a substantially equal extent, and whereby undesirable oscillatory reaction of said glow lamp to a range of transient signals between said maximum and said minimum current levels is minimized.

2. A method for preaging a sealed glow lamp containing an inert gas and having at least two electrodes, said method comprising the steps of establishing and maintaining for a first interval of time an alternating current in said glow lamp which corresponds in value to the current to be expected from a minimum transient signal in subsequent circuit use, and establishing and maintaining for a second interval of time an alternating current in said glow lamp which corresponds in value to the current to be expected from a maximum transient signal in subsequent circuit use, whereby said electrodes are preaged to a substantially equal extent, and whereby undesirable oscillatory reaction of said glow lamp to a range of transient signals between said minimum and said maximum current levels is minimized.

References Cited in the file of this patent

UNITED STATES PATENTS

| | | |
|---|---|---|
| 1,923,051 | Case | Aug. 15, 1933 |
| 1,993,022 | Smith | Mar. 5, 1935 |
| 2,583,029 | Townsend | Jan. 22, 1952 |
| 2,804,365 | Flowers | Aug. 27, 1957 |